(12) United States Patent
Beller et al.

(10) Patent No.: US 11,163,804 B2
(45) Date of Patent: Nov. 2, 2021

(54) CORPUS MANAGEMENT BY AUTOMATIC CATEGORIZATION INTO FUNCTIONAL DOMAINS TO SUPPORT FACETED QUERYING

(71) Applicant: International Business Machines Corporation, Armonk, NY (US)

(72) Inventors: Charles E. Beller, Baltimore, MD (US); William G. Dubyak, Severna Park, MD (US); Palani Sakthi, Palantine, IL (US); Kristen M. Summers, Takoma Park, MD (US)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 16/402,692

(22) Filed: May 3, 2019

(65) Prior Publication Data

US 2019/0258652 A1 Aug. 22, 2019

Related U.S. Application Data

(63) Continuation of application No. 15/354,556, filed on Nov. 17, 2016, now Pat. No. 10,346,442.

(51) Int. Cl.
*G06F 16/28* (2019.01)
*G06F 7/08* (2006.01)
(Continued)

(52) U.S. Cl.
CPC ............ *G06F 16/285* (2019.01); *G06F 7/08* (2013.01); *G06F 16/2228* (2019.01); *G06F 16/248* (2019.01); *G06F 16/2455* (2019.01)

(58) Field of Classification Search
CPC ............ G06F 16/2228; G06F 16/2455; G06F 16/285; G06F 40/30
(Continued)

(56) References Cited

U.S. PATENT DOCUMENTS 7,325,201 B2 1/2008 Ferrari et al.
7,392,250 B1 * 6/2008 Dash .................. G06F 16/2465
707/776

(Continued)

FOREIGN PATENT DOCUMENTS

WO 2015058232 A1 4/2015

OTHER PUBLICATIONS

Ozgur et al., "Text Categorization with Class-Based and Corpus-Based Keyword Selection", Springer, 2005.
(Continued)

*Primary Examiner* — Hung T Vy
(74) *Attorney, Agent, or Firm* — Troutman Pepper Hamilton Sanders LLP

(57) ABSTRACT

Embodiments can provide a computer implemented method, in a data processing system comprising a processor and a memory comprising instructions which are executed by the processor to cause the processor to implement an enhanced corpus management system, the method comprising: identifying one or more functional domain categories; ingesting one or more incoming documents to form an open-domain corpus; for each functional domain category, identifying one or more representative documents to establish a seed sub-corpus; calculating a degree of fit score between each of the one or more incoming documents and the one or more established functional domain category seed sub-corpora; and assigning one or more of the incoming documents to one or more of the functional domain categories based upon the degree of fit score to create an enhanced corpus.

20 Claims, 5 Drawing Sheets

(51) Int. Cl.
*G06F 16/22* (2019.01)
*G06F 16/2455* (2019.01)
*G06F 16/248* (2019.01)

(58) Field of Classification Search
USPC .................................................. 707/723, 738
See application file for complete search history.

(56) References Cited

U.S. PATENT DOCUMENTS

| | | | |
|---|---|---|---|
| 7,428,528 | B1 | 9/2008 | Ferrari et al. |
| 7,853,544 | B2 | 12/2010 | Scott et al. |
| 8,131,756 | B2 | 3/2012 | Carus et al. |
| 9,141,690 | B2 | 9/2015 | Oksman et al. |
| 9,535,910 | B2 * | 1/2017 | Allen .................... G06N 5/022 |
| 2011/0125734 | A1 | 5/2011 | Duboue et al. |
| 2011/0264651 | A1 * | 10/2011 | Selvaraj .............. G06F 16/9535 707/723 |
| 2013/0226916 | A1 | 8/2013 | Dredze et al. |
| 2015/0154264 | A1 | 6/2015 | Lightner et al. |
| 2015/0205785 | A1 * | 7/2015 | Beckwith ................ G06F 16/35 707/738 |
| 2015/0347557 | A1 * | 12/2015 | Allen .................... G06F 16/285 707/738 |
| 2017/0124085 | A1 * | 5/2017 | Khan ....................... G06N 5/04 |

OTHER PUBLICATIONS

Sebastiani, Fabrizio. "Machine learning in automated text categorization." ACM computing surveys (CSUR) 34.1 (2002): 1-47.
Han, Eui-Hong Sam, and George Karypis. Centroid-based document classification: Analysis and experimental results Springer Berlin Heidelberg, 2000.
Hearst, Marti. "Design recommendations for hierarchical faceted search interfaces." ACM SIGIR workshop on faceted search. 2006.
Tunkelang, Daniel. "Dynamic category sets: An approach for faceted search." ACM SIGIR. vol. 6. 2006.
Yuan et al., "Watson and Healthcare," IBM developerWorks, 2011.
Rob High, "The Era of Cognitive Systems: An Inside Look at IBM Watson and How it Works" IBM Redbooks, 2012.
Nov. 17, 2016, U.S. Appl. No. 15/354,556, 2018/0137190 A1.

* cited by examiner

CORPUS MANAGEMENT BY AUTOMATIC CATEGORIZATION INTO FUNCTIONAL DOMAINS TO SUPPORT FACETED QUERYING

CROSS REFERENCE TO RELATED APPLICATIONS

This application is a continuation of U.S. patent application Ser. No. 15/354,556, filed on Nov. 17, 2016, which is incorporated herein by reference in its entirety.

STATEMENT REGARDING FEDERALLY SPONSORED RESEARCH OR DEVELOPMENT

This invention was made with government support under contract number 2013-12101100008 awarded by United States defense agencies. The government has certain rights to this invention.

TECHNICAL FIELD

The present application relates generally to a system and method that can be used to manage a corpus through automatic categorization into functional domains in order to support faceted querying.

BACKGROUND

Queries run against a full open-domain corpus can run into difficulties, especially on terms that have highly context dependent meanings. For instance, if a user is interested in information about the Association for Computational Linguistics, and submits "ACL" as a query term, they are likely to be overwhelmed by information about sports injuries and the anterior cruciate ligament (colloquially referred to as the "ACL"), which is unwanted information that is unrelated to the user's original interest.

If the corpus contains information about what functional domain a document belongs to, then one approach to improving search results can be to facet the search by limiting access to a specific subset of an open domain corpus. In the example given above, faceting would include excluding documents from the medical domain. Manually categorizing documents by domain, however, can be prohibitively expensive and resource-consuming, especially when dealing with extremely large corpora (10+ million documents). Further, any change in the number or granularity of domains could require re-categorizing the documents of the corpus, leading to further expense.

SUMMARY

Embodiments can provide a computer implemented method, in a data processing system comprising a processor and a memory comprising instructions which are executed by the processor to cause the processor to implement an enhanced corpus management system, the method comprising: identifying one or more functional domain categories; ingesting one or more incoming documents to form an open-domain corpus; for each functional domain category, identifying one or more representative documents to establish a seed sub-corpus; calculating a degree of fit score between each of the one or more incoming documents and the one or more established functional domain category seed sub-corpora; and assigning one or more of the incoming documents to one or more of the functional domain categories based upon the degree of fit score to create an enhanced corpus.

Embodiments can further provide a method further comprising for each functional domain category, identifying one or more representative documents to establish a seed sub-corpus through index faceting, comprising: splitting the open-domain corpus into one or more separate search indices corresponding to the one or more functional domain categories; sorting the one or more incoming documents into a single most appropriate functional domain category; if a particular incoming document is inappropriate for any functional domain category, discarding the particular incoming document; and regenerating indices for functional domain categories that gained documents during the sorting.

Embodiments can further provide a method further comprising if a particular incoming document is applicable to multiple functional domain categories, assigning the document to one or more additional indices.

Embodiments can further provide a method further comprising for each functional domain category, identifying one or more representative documents to establish a seed sub-corpus through metadata faceting using a hard decision boundary.

Embodiments can further provide a method further comprising for each functional domain category, identifying one or more representative documents to establish a seed sub-corpus through metadata faceting using a soft decision boundary.

Embodiments can further provide a method further comprising measuring cosine similarity between each incoming document and the representative documents of each sub-corpora; and measuring redundancy through maximum inverse cosine similarity between each incoming document and the representative documents of each sub-corpora.

Embodiments can further provide a method further comprising through a cognitive system, providing one or more answers to one or more questions using the enhanced corpus.

In another illustrative embodiment, a computer program product comprising a computer usable or readable medium having a computer readable program is provided. The computer readable program, when executed on a processor, causes the processor to perform various ones of, and combinations of, the operations outlined above with regard to the method illustrative embodiment.

In yet another illustrative embodiment, a system is provided. The system may comprise an enhanced corpus management processor configured to perform various ones of, and combinations of, the operations outlined above with regard to the method illustrative embodiment.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

Figure 1:
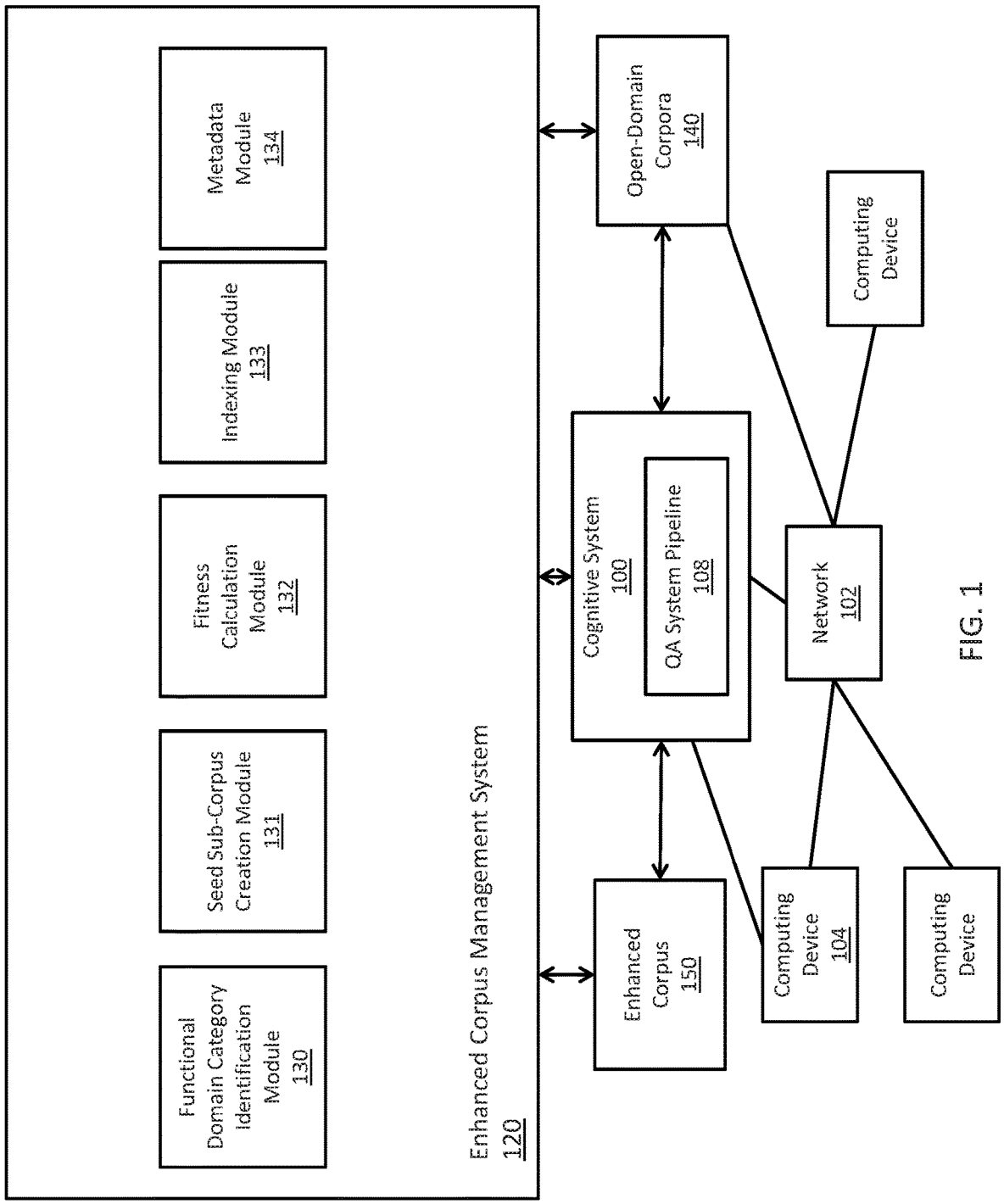
FIG. 1 depicts a schematic diagram of one illustrative embodiment of a cognitive system implementing an enhanced corpus management system in a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. IBM Watson™ is an example of one such cognitive system which can process human readable language and identify inferences between text passages with human-like accuracy at speeds far faster than human beings and on a much larger scale. In general, such cognitive systems are able to perform the following functions:

- Navigate the complexities of human language and understanding
- Ingest and process vast amounts of structured and unstructured data
- Generate and evaluate hypotheses
- Weigh and evaluate responses that are based only on relevant evidence
- Provide situation-specific advice, insights, and guidance
- Improve knowledge and learn with each iteration and interaction through machine learning processes
- Enable decision making at the point of impact (contextual guidance)
- Scale in proportion to the task
- Extend and magnify human expertise and cognition
- Identify resonating, human-like attributes and traits from natural language
- Deduce various language specific or agnostic attributes from natural language
- High degree of relevant recollection from data points (images, text, voice) (memorization and recall)
- Predict and sense with situation awareness that mimic human cognition based on experiences
- Answer questions based on natural language and specific evidence In one aspect, cognitive systems provide mechanisms for answering questions posed to these cognitive systems using a Question Answering pipeline or system (QA system). The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area (e.g., financial domain, medical domain, legal domain, etc.) where the body of knowledge (knowledgebase) can be organized in a variety of configurations, e.g., a structured repository of domain-specific information, such as ontologies, or unstructured data related to the domain, or a collection of natural language documents about the domain.

FIG. 1 depicts a schematic diagram of one illustrative embodiment of a cognitive system 100 implementing a question and answer (QA) pipeline 108 and an enhanced corpus management system 120 in a computer network 102. One example of a question/answer generation operation which may be used in conjunction with the principles described herein is described in U.S. Patent Application Publication No. 2011/0125734, which is herein incorporated by reference in its entirety. The cognitive system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The cognitive system 100 and network 102 enables enhanced corpus management functionality for one or more cognitive system users via their respective computing devices. Other embodiments of the cognitive system 100 may be used with components, systems, sub-systems, and/or devices other than those that are depicted herein.

The cognitive system 100 is configured to implement a QA pipeline 108 that receive inputs from various sources. For example, the cognitive system 100 receives input from the network 102, a corpus of electronic documents 140, cognitive system users, and/or other data and other possible sources of input. In one embodiment, some or all of the inputs to the cognitive system 100 are routed through the network 102. The various computing devices 104 on the network 102 include access points for content creators and QA system users. Some of the computing devices 104 include devices for a database storing the corpus of data 140. Portions of the corpus of data 140 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus of data 140 for use as part of a corpus of data with the cognitive system 100. The document includes any file, text, article, or source of data for use in the cognitive system 100. QA system users access the cognitive system 100 via a network connection or an Internet connection to the network 102, and input questions to the cognitive system 100 that are answered by the content in the corpus of data 140. In an embodiment, full questions can be generated and entered into the QA system using the enhanced corpus management system 120 described herein. The cognitive system 100 parses and interprets a full question via a QA pipeline 108, and provides a response containing one or more answers to the question. In some embodiments, the cognitive system 100 provides a response to users in a ranked list of candidate answers while in other illustrative embodiments, the cognitive system 100 provides a single final answer or a combination of a final answer and ranked listing of other candidate answers.

The cognitive system 100 implements the QA pipeline 108 which comprises a plurality of stages for processing an input question and the corpus of data 140. The QA pipeline 108 generates answers for the input question based on the processing of the input question and the corpus of data 140. In some illustrative embodiments, the cognitive system 100 may be the IBM Watson™ cognitive system available from International Business Machines Corporation of Armonk, N.Y., which is augmented with the mechanisms of the illustrative embodiments described hereafter. As outlined previously, a QA pipeline of the IBM Watson™ cognitive system receives an input question, which it then parses to extract the major features of the question, and which in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The QA pipeline of the IBM Watson™ cognitive system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the QA pipeline of the IBM Watson™ cognitive system has regarding the evidence that the potential response, i.e., candidate answer, is inferred by the question. This process is repeated for each of the candidate answers to generate a ranked listing of candidate answers which may then be presented to the user that submitted the input question, or from which a final answer is selected and presented to the user. More information about the QA pipeline of the IBM Watson™ cognitive system may be obtained, for example, from the IBM Corporation website, IBM Redbooks, and the like. For example, information about the QA pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As shown in FIG. 1, in accordance with some illustrative embodiments, the cognitive system 100 is further augmented, in accordance with the mechanisms of the illustrative embodiments, to include logic implemented in specialized hardware, software executed on hardware, or any combination of specialized hardware and software executed on hardware, for implementing an enhanced corpus management system 120. As described further in FIGS. 3-6, the enhanced corpus management system 120 can be used to process open-domain corpora using a functional domain category identification module 130, a seed sub-corpus creation module 131, a fitness calculation module 132, an indexing module 133, and a metadata module 134 to create an enhanced corpus 150. These open-domain corpora 140 can typically contain documents from many sources (e.g. the New York Times, AP News, Research Journals, Twitter, etc.), published over a number of years, and can contain documents whose content addresses many different functional domains (e.g. sports, medicine, politics, etc.).

The enhanced corpus management system can apply automatic text classification techniques to corpus management. In an embodiment, the system 120 can automatically tag incoming documents for their respective functional domains (e.g. sports, medicine, politics, etc.). This can allow for improved search results of faceted corpus access without requiring a human to manually categorize the documents, which may be impossible when the number of documents enters the millions or tens of millions. Such faceting can improve accuracy on questions containing terms with domain specific meanings.

Figure 2:
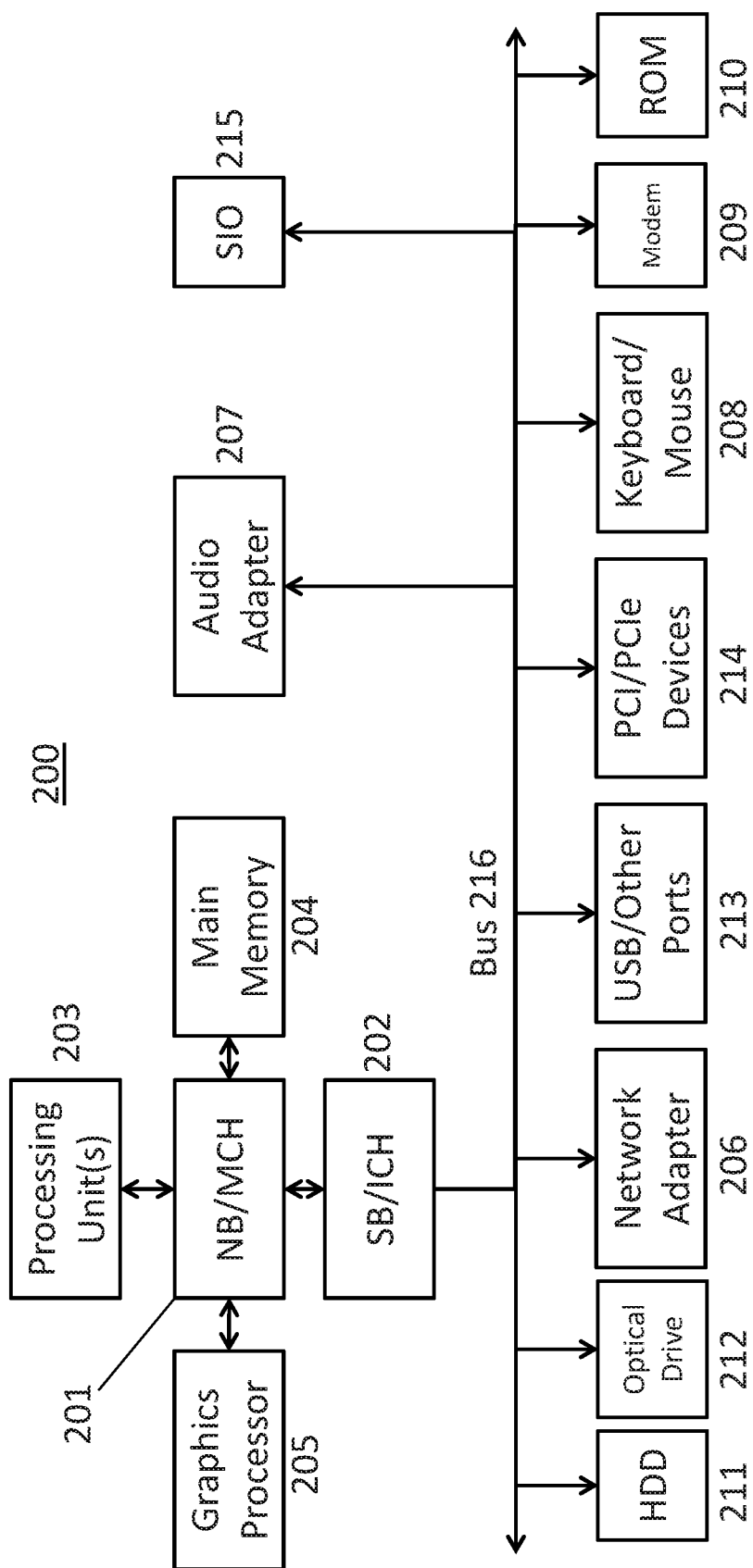
FIG. 2 is a block diagram of an example data processing system in which aspects of the illustrative embodiments may be implemented.

FIG. 2 is a block diagram of an example data processing system 200 in which aspects of the illustrative embodiments are implemented. Data processing system 200 is an example of a computer, such as a server or client, in which computer usable code or instructions implementing the process for illustrative embodiments of the present invention are located. In one embodiment, FIG. 2 represents a server computing device, such as a server, which implements the enhanced corpus management system 120 and cognitive system 100 described herein.

In the depicted example, data processing system 200 can employ a hub architecture including a north bridge and memory controller hub (NB/MCH) 201 and south bridge and input/output (I/O) controller hub (SB/ICH) 202. Processing unit 203, main memory 204, and graphics processor 205 can be connected to the NB/MCH 201. Graphics processor 205 can be connected to the NB/MCH through an accelerated graphics port (AGP).

In the depicted example, the network adapter 206 connects to the SB/ICH 202. The audio adapter 207, keyboard and mouse adapter 208, modem 209, read only memory (ROM) 210, hard disk drive (HDD) 211, optical drive (CD or DVD) 212, universal serial bus (USB) ports and other communication ports 213, and the PCI/PCIe devices 214 can connect to the SB/ICH 202 through bus system 216. PCI/PCIe devices 214 may include Ethernet adapters, add-in cards, and PC cards for notebook computers. ROM 210 may be, for example, a flash basic input/output system (BIOS). The HDD 211 and optical drive 212 can use an integrated drive electronics (IDE) or serial advanced technology attachment (SATA) interface. The super I/O (SIO) device 215 can be connected to the SB/ICH.

An operating system can run on processing unit 203. The operating system can coordinate and provide control of various components within the data processing system 200. As a client, the operating system can be a commercially available operating system. An object-oriented programming system, such as the Java™ programming system, may run in conjunction with the operating system and provide calls to the operating system from the object-oriented programs or applications executing on the data processing system 200. As a server, the data processing system 200 can be an IBM® eServer™ System P® running the Advanced Interactive Executive operating system or the Linux operating system. The data processing system 200 can be a symmetric multiprocessor (SMP) system that can include a plurality of processors in the processing unit 203. Alternatively, a single processor system may be employed.

Instructions for the operating system, the object-oriented programming system, and applications or programs are located on storage devices, such as the HDD 211, and are loaded into the main memory 204 for execution by the processing unit 203. The processes for embodiments of the enhanced corpus management system can be performed by the processing unit 203 using computer usable program code, which can be located in a memory such as, for example, main memory 204, ROM 210, or in one or more peripheral devices.

A bus system 216 can be comprised of one or more busses. The bus system 216 can be implemented using any type of communication fabric or architecture that can provide for a transfer of data between different components or devices attached to the fabric or architecture. A communication unit such as the modem 209 or network adapter 206 can include one or more devices that can be used to transmit and receive data.

Those of ordinary skill in the art will appreciate that the hardware depicted in FIG. 2 may vary depending on the implementation. Other internal hardware or peripheral devices, such as flash memory, equivalent non-volatile memory, or optical disk drives may be used in addition to or in place of the hardware depicted. Moreover, the data processing system 200 can take the form of any of a number of different data processing systems, including but not limited to, client computing devices, server computing devices, tablet computers, laptop computers, telephone or other communication devices, personal digital assistants, and the like. Essentially, data processing system 200 can be any known or later developed data processing system without architectural limitation.

Figure 3:
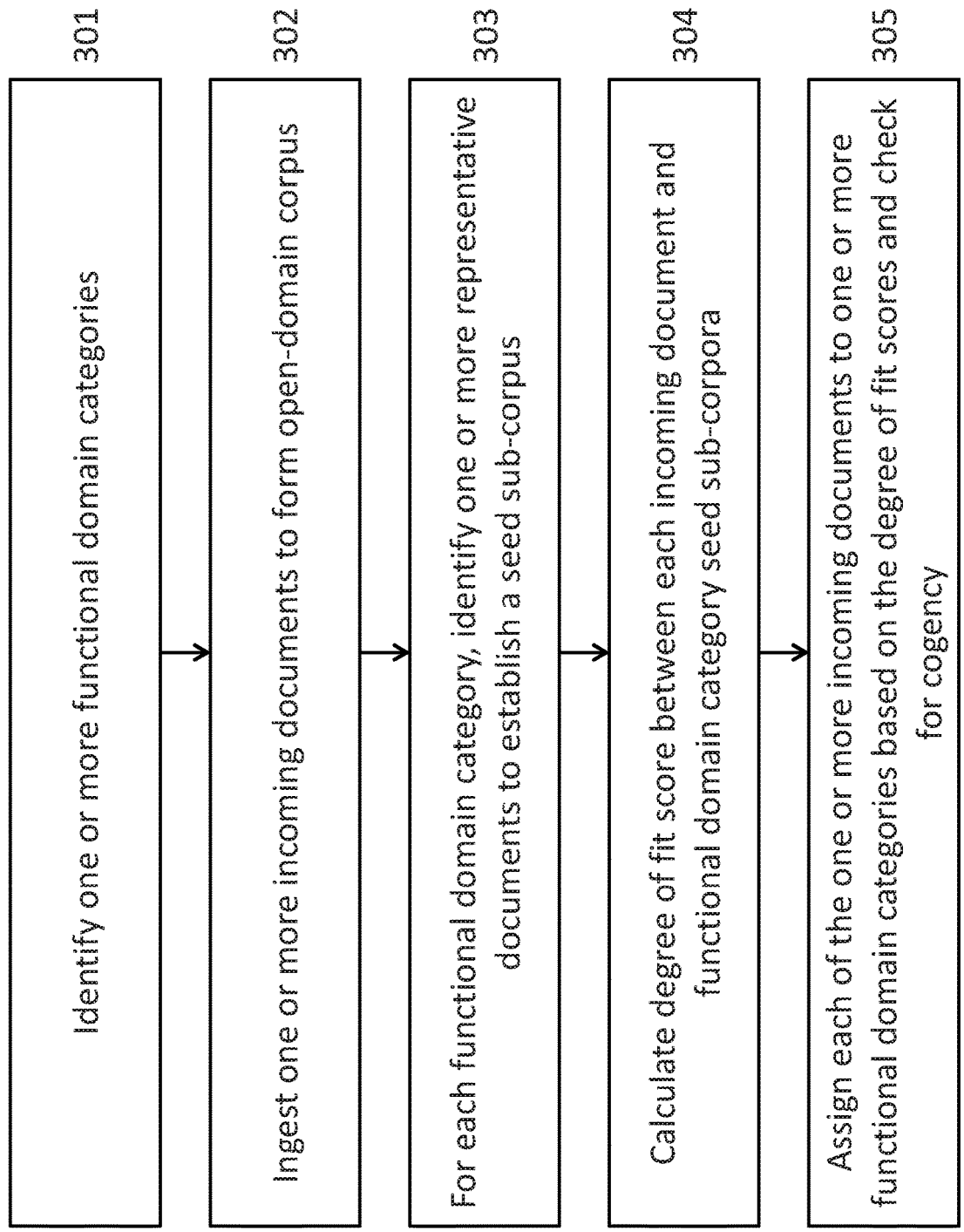
FIG. 3 depicts a flowchart illustrating the functionality of an enhanced corpus management system, in accordance with embodiments described herein.
Figure 4:
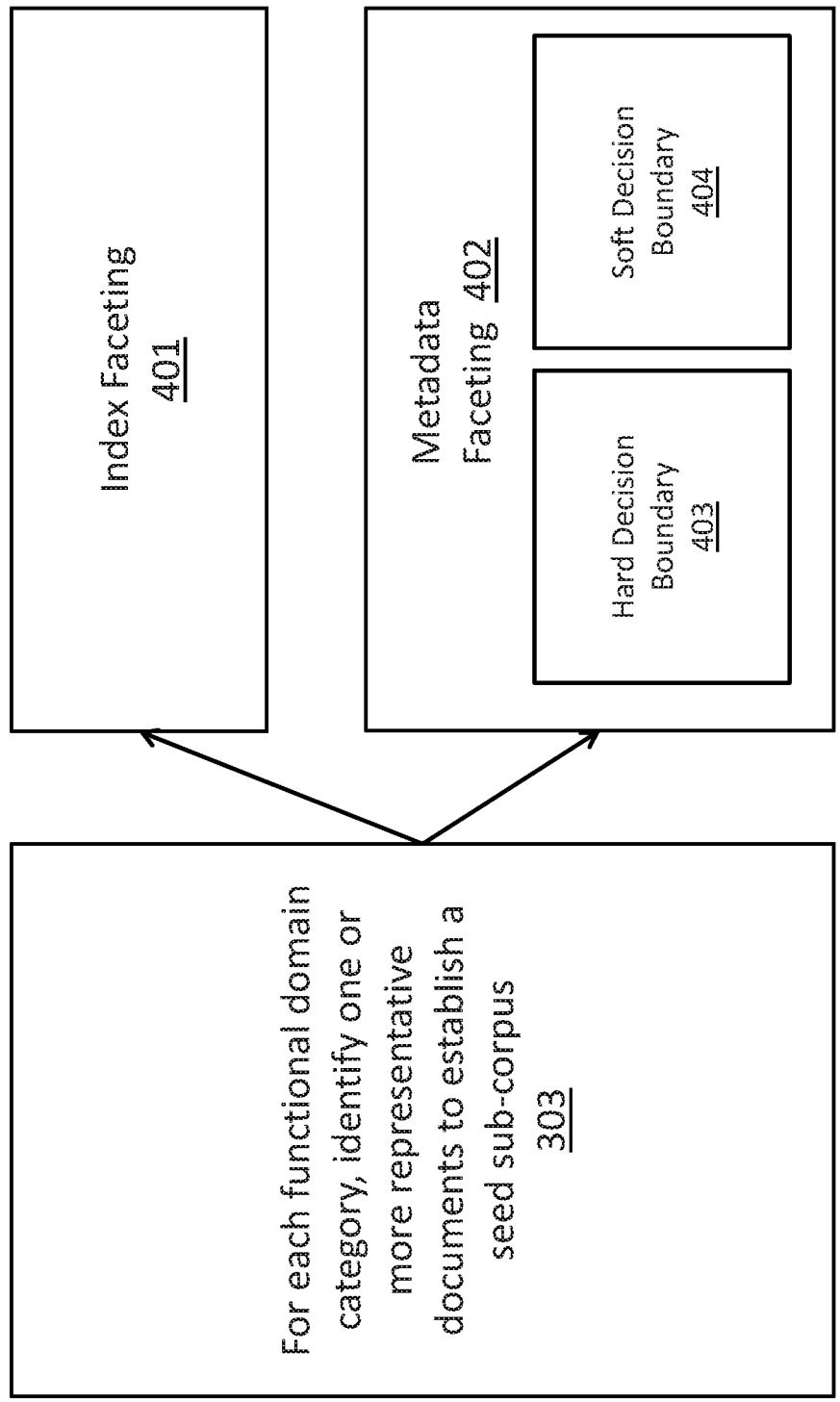
FIG. 4 depicts a flowchart illustrating the functionality of an enhanced corpus management system, in accordance with embodiments described herein.

FIGS. 3 and 4 depict flowcharts illustrating the functionality of an enhanced corpus management system 120, in accordance with embodiments described herein. As a preliminary step, the enhanced corpus management system can identify one or more desired functional domain categories 301, using the functional domain category identification module 130 (as shown in FIG. 1). The number of functional domain categories can be without limit, but can generally correspond to overarching subject matter categories, such as "medicine," "sports," "entertainment," "cooking," "finance," "politics," and other broad categorizations.

After the system has identified the one or more desired functional domain categories 301, the system can ingest one or more incoming documents 302. The one or more incoming documents can be stored as the open-domain corpus from which the cognitive system can draw information for use in the QA pipeline. In an embodiment, the one or more incoming documents can be sourced from a user or can be drawn from a general body of knowledge, such as a library or the Internet.

As each of the one or more incoming documents is ingested by the system 302, the incoming documents can be processed. For each functional domain category, the system can identify one or more representative documents in order to establish a seed sub-corpus for that functional domain 303, using the seed sub-corpus creation module 131 (as shown in FIG. 1). In an embodiment, the identification of the one or more representative documents can be performed through index faceting 401 or metadata faceting 402. In an embodiment, the seed sub-corpora documents can be represented in vector form.

Figure 5:
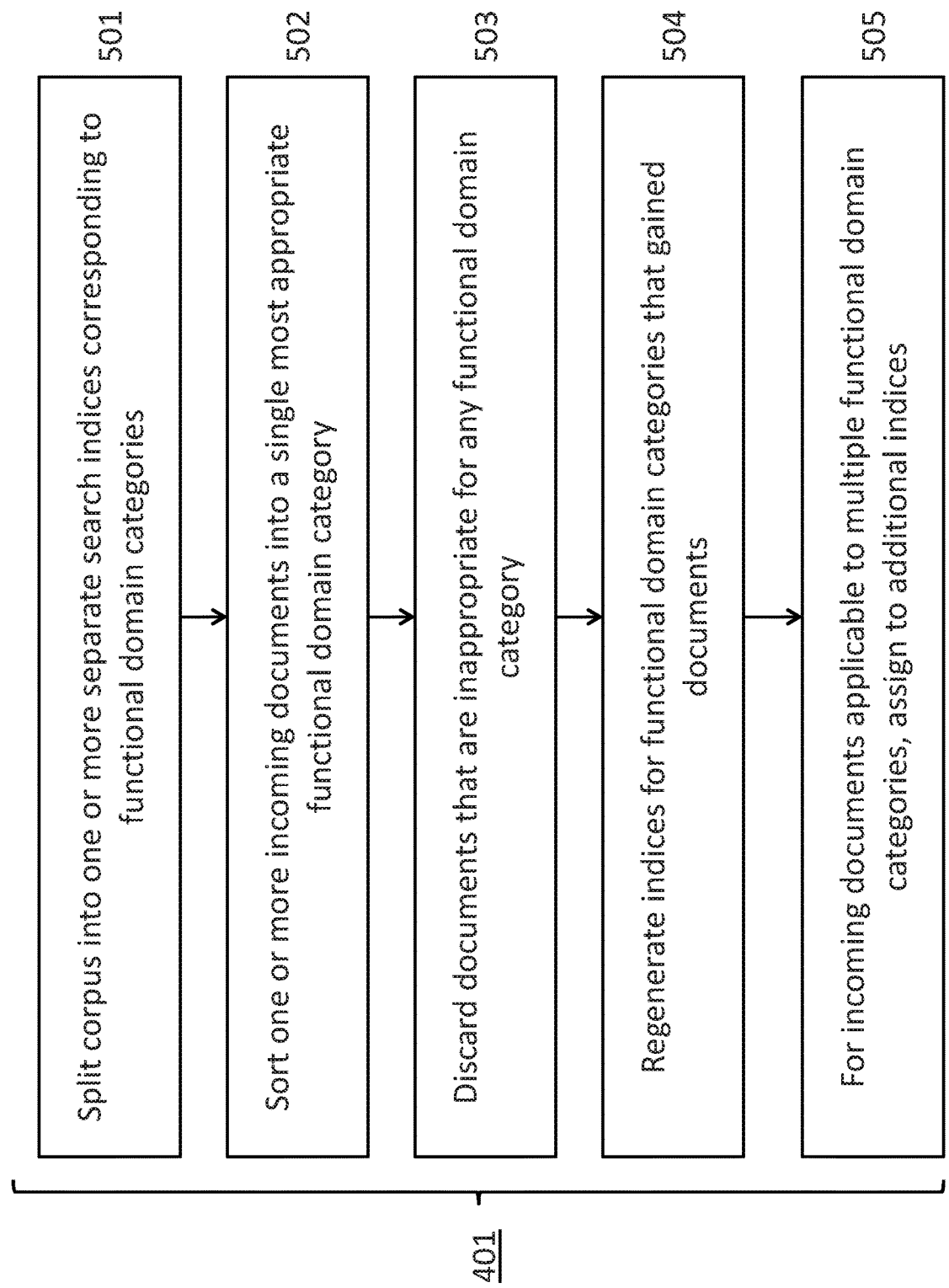
FIG. 5 depicts a flowchart illustrating the index faceting functionality of an indexing module, in accordance with embodiments described herein.

FIG. 5 depicts a flowchart illustrating the index faceting functionality 401 of the indexing module 133 (as shown in FIG. 1), in accordance with embodiments described herein. The corpus can be split into one or more separate search indices 501. The one or more separate search indices can correspond to the functional domain categories. In an embodiment, only a subset of the indices can searched. During faceting by index variant 401, the one or more incoming documents can be sorted into a single most appropriate functional domain category 502. In an embodiment, the sorting can be performed manually by user review, or can utilize natural language processing techniques to parse the subject matter of each incoming document in order to best determine the single most appropriate functional domain category. After sorting, any incoming documents that are inappropriate for any functional domain category can be discarded. After a batch of sorting, indices can be regenerated for domains that gained documents 504. The faceting by index approach can give the enhanced corpus management system the ability to limit a search to a single index, but does require batch sorting of incoming documents and requires a hard decision boundary.

Documents can be assigned to multiple domains by including them in multiple indices 505, which can lead to redundancy in non-faceted searches. For example, a document relating to health issues in football can reasonably be considered to belong in both the "sports" and "medical" domains. In order for the document to be part of both domains using the indexing approach 401, the document can be added to both the "sports" index and the "medical" index. Thus, searching over all of the indices has the potential to retrieve both the "sports" and the "medical" copy of the document, which may give the contents of the document more weight than may be appropriate.

Returning to FIG. 4, the identification of one or more representative documents to establish a seed sub-corpus 303 can alternatively be performed through metadata faceting 402, using the metadata module 134 (as shown in FIG. 1). Using metadata-based faceting 402, searching can occur across all functional domain categories, but only returns documents that meet certain metadata criteria. Metadata faceting 402 can be accomplished using a hard decision boundary 403 or a soft decision boundary 404.

Through use of a hard decision boundary 403, documents can be given metadata labels for all functional domain categories that achieve a threshold goodness of fit. Faceting is done by filtering results to ensure that they match the required metadata labels. This approach can allow a document to be assigned to multiple domains without contributing to redundancy in a non-faceted search. It also can allow the sorting to be done in a streaming fashion.

Through use of a soft decision boundary 404, metadata faceting can be implemented in a way that gives even finer control by assigning all functional domain category labels to all documents with associated scores that reflect a goodness of fit for each functional domain category. Metadata faceting can then be done by limiting results to documents that are above a given threshold for a given functional domain category. For example, if a user is interested in sports but wants to avoid articles on sports medicine, the user can limit their search to documents that have at a score above 0.6 for the "sports" domain and a score below 0.2 for the "medicine" domain.

Returning to FIG. 3, upon establishing seed sub-corpora for each of the functional domain categories 303, the system can calculate a degree of fit score between each of the one or more incoming documents and the functional domain sub-corpora 304, using the fitness calculation module 132 (as shown in FIG. 1). This can be done using degree of fit calculations known in the art, which can calculate how useful an incoming document will be to a corpus by combining a similarity metric with a redundancy metric. Similarity can be measured using cosine similarity between a document and the representative documents of a sub-corpus. Redundancy can be measured using the maximum inverse cosine similarity between a document and the representative documents of a sub-corpus.

Finally, each of the one or more incoming documents can be assigned to one or more of the functional domain categories based upon the calculated degree of fit score 305, which can create an enhanced corpus 150 (as shown in FIG. 1). In an embodiment, early in the process, when the corpus as a whole is still small, tools such as dynamic faceting can be used to do human-in-the-loop sanity checks to ensure that the functional domain categories are cogent and are behaving as expected. If the functional domain categories are judged to be amiss, they can be remedied by adding one or two more representative documents that are judged, either by a user or through natural language processing, as good exemplars of each functional domain category to their respective initial seed corpora. Steps 304 and 305 can be re-run and the results rechecked.

The enhanced corpus management system 120 described herein improves over prior attempts to enhance corpora by automatic text categorization to divide a corpus (or sort incoming documents into the corpus) into functional domain categories at ingest-time as a way to scale up the support of run-time faceted searches to large corpora (for example, corpora with tens of millions of documents). The particular use case motivating the improvement is the management of a large corpus that supports deep question answering, but the enhanced corpus management system 120 can apply to any corpus-backed application. The end result of the enhanced corpus management system is very different from traditional text categorization methods like spam filters, where the output of the classifier is directly viewed by a user. Instead, the output of the enhanced corpus management system in turn feeds a system that is reasonably robust to noise, and so can err on the side of recall rather than precision.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

The system and processes of the figures are not exclusive. Other systems, processes and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112, sixth paragraph, unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer implemented method, in a data processing system comprising a processor and a memory comprising instructions which are executed by the processor to cause the processor to implement an enhanced corpus management system, the method comprising:
    identifying one or more functional domain categories;
    ingesting one or more incoming documents to form an open-domain corpus;
    for each functional domain category, identifying one or more representative documents to establish a seed sub-corpus through index faceting comprising,
        splitting the open-domain corpus into one or more separate search indices corresponding to the one or more functional domain categories;
        sorting the one or more representative documents into one of the one or more functional domain categories; and
        regenerating new search indices for the one or more functional domain categories;
    calculating a degree of fit score between each of the one or more incoming documents and the one or more established functional domain category seed sub-corpora; and
    assigning one or more of the incoming documents to one or more of the functional domain categories based upon the degree of fit score to create an enhanced corpus.

2. The method as recited in claim 1, wherein the one or more representative documents in the seed sub-corpora documents are represented in a vector form.

3. The method as recited in claim 1, further comprising:
    performing a human-in-the-loop sanity check through a dynamic faceting;
    if one of the functional domain categories is judged to be amiss,
        adding one or more additional representative documents to the seed sub-corpus corresponding to the one of the functional domain categories.

4. The method as recited in claim 1, further comprising:
    for each functional domain category, identifying one or more representative documents to establish a seed sub-corpus through metadata faceting using a hard decision boundary.

5. The method as recited in claim 1, further comprising:
    for each functional domain category, identifying one or more representative documents to establish a seed sub-corpus through metadata faceting using a soft decision boundary.

6. The method as recited in claim 1, further comprising:
measuring cosine similarity between each incoming document and the representative documents of each sub-corpora; and
measuring redundancy through maximum inverse cosine similarity between each incoming document and the representative documents of each sub-corpora.

7. The method as recited in claim 1, further comprising:
through a cognitive system, providing one or more answers to one or more questions using the enhanced corpus.

8. A computer program product for enhanced corpus management, the computer program product comprising a computer readable storage medium having program instructions embodied therewith, the program instructions executable by a processor to cause the processor to:
identify one or more functional domain categories;
ingest one or more incoming documents to form an open-domain corpus;
for each functional domain category, identify one or more representative documents to establish a seed sub-corpus through index faceting comprising,
split the open-domain corpus into one or more separate search indices corresponding to the one or more functional domain categories;
sort the one or more representative documents into one of the one or more functional domain categories; and
regenerate new search indices for the one or more functional domain categories;
calculate a degree of fit score between each of the one or more incoming documents and the one or more established functional domain category seed sub-corpora; and
assign one or more of the incoming documents to one or more of the functional domain categories based upon the degree of fit score to create an enhanced corpus.

9. The computer program product as recited in claim 8, wherein the one or more representative documents in the seed sub-corpora documents are represented in a vector form.

10. The computer program product as recited in claim 8, wherein the processor is further caused to:
perform a human-in-the-loop sanity check through a dynamic faceting;
if one of the functional domain categories is judged to be amiss,
add one or more additional representative documents to the seed sub-corpus corresponding to the one of the functional domain categories.

11. The computer program product as recited in claim 8, wherein the processor is further caused to:
for each functional domain category, identify one or more representative documents to establish a seed sub-corpus through metadata faceting using a hard decision boundary.

12. The computer program product as recited in claim 8, wherein the processor is further caused to:
for each functional domain category, identify one or more representative documents to establish a seed sub-corpus through metadata faceting using a soft decision boundary.

13. The computer program product as recited in claim 8, wherein the processor is further caused to:
measure cosine similarity between each incoming document and the representative documents of each sub-corpora; and
measure redundancy through maximum inverse cosine similarity between each incoming document and the representative documents of each sub-corpora.

14. The computer program product as recited in claim 8, wherein the processor is further caused to:
through a cognitive system, provide one or more answers to one or more questions using the enhanced corpus.

15. An enhanced corpus management system, comprising:
a processor configured to:
identify one or more functional domain categories;
ingest one or more incoming documents to form an open-domain corpus;
for each functional domain category, identify one or more representative documents to establish a seed sub-corpus through index faceting comprising,
split the open-domain corpus into one or more separate search indices corresponding to the one or more functional domain categories;
sort the one or more representative documents into one of the one or more functional domain categories; and
regenerate new search indices for the one or more functional domain categories;
calculate a degree of fit score between each of the one or more incoming documents and the one or more established functional domain category seed sub-corpora; and
assign one or more of the incoming documents to one or more of the functional domain categories based upon the degree of fit score to create an enhanced corpus.

16. The system as recited in claim 15, wherein the one or more representative documents in the seed sub-corpora documents are represented in a vector form.

17. The system as recited in claim 16, wherein the enhanced corpus management processor is further configured to:
perform a human-in-the-loop sanity check through a dynamic faceting;
if one of the functional domain categories is judged to be amiss,
add one or more additional representative documents to the seed sub-corpus corresponding to the one of the functional domain categories.

18. The system as recited in claim 15, wherein the enhanced corpus management processor is further configured to:
for each functional domain category, identify one or more representative documents to establish a seed sub-corpus through metadata faceting using a hard decision boundary.

19. The system as recited in claim 15, wherein the enhanced corpus management processor is further configured to:
for each functional domain category, identify one or more representative documents to establish a seed sub-corpus through metadata faceting using a soft decision boundary.

20. The system as recited in claim 15, wherein the enhanced corpus management processor is further configured to:
measure cosine similarity between each incoming document and the representative documents of each sub-corpora; and
measure redundancy through maximum inverse cosine similarity between each incoming document and the representative documents of each sub-corpora.

* * * * *